April 12, 1960
R. CREVELING
2,932,737
COUNTING CIRCUITS
Original Filed Oct. 24, 1952
3 Sheets-Sheet 1
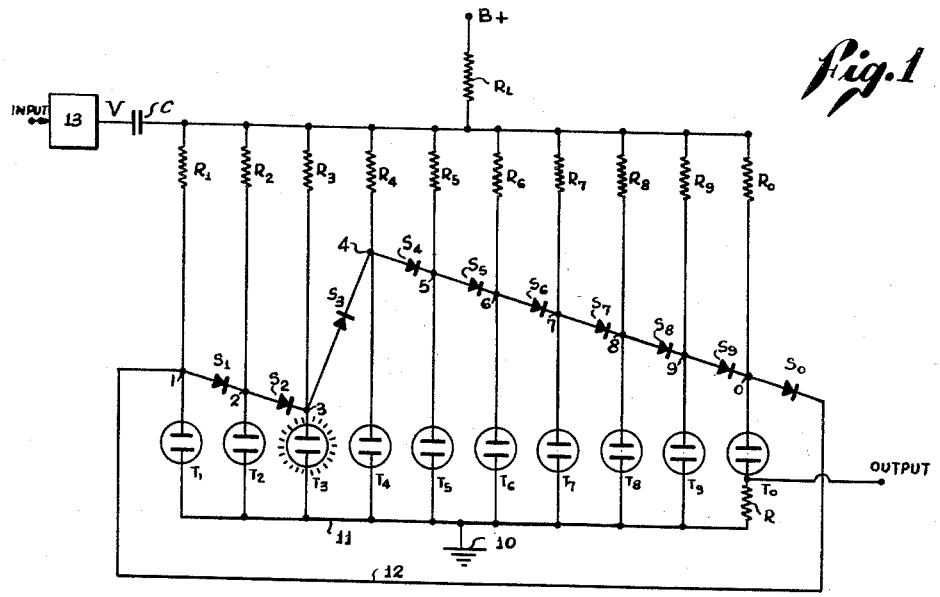
Fig.1
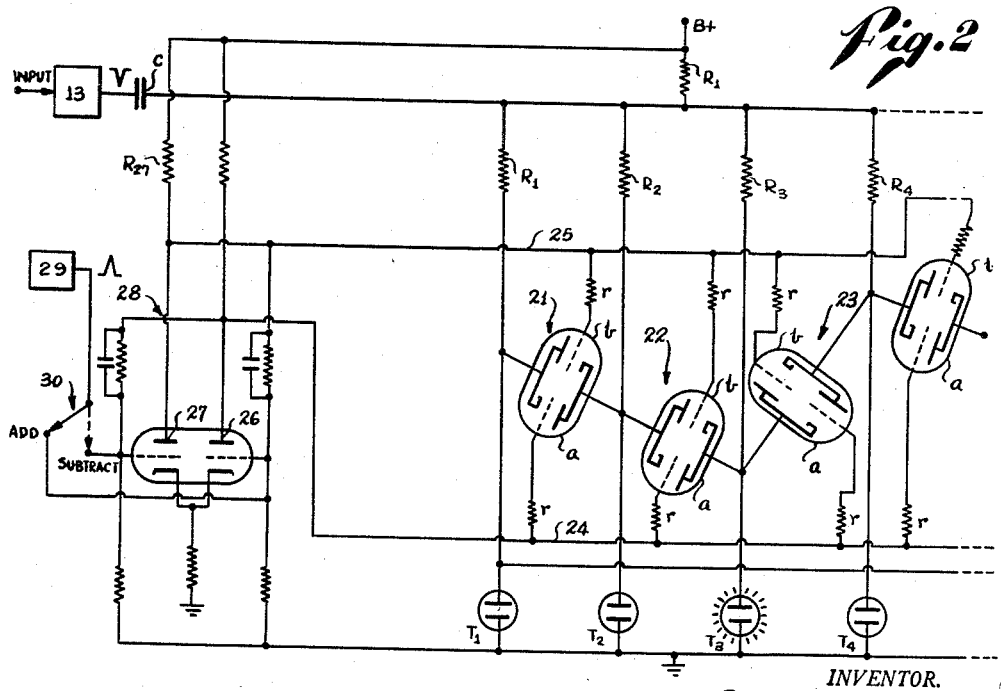
Fig.2
INVENTOR.
ROBERT CREVELING
BY
Attorney April 12, 1960 R. CREVELING 2,932,737
COUNTING CIRCUITS
Original Filed Oct. 24, 1952 3 Sheets-Sheet 2
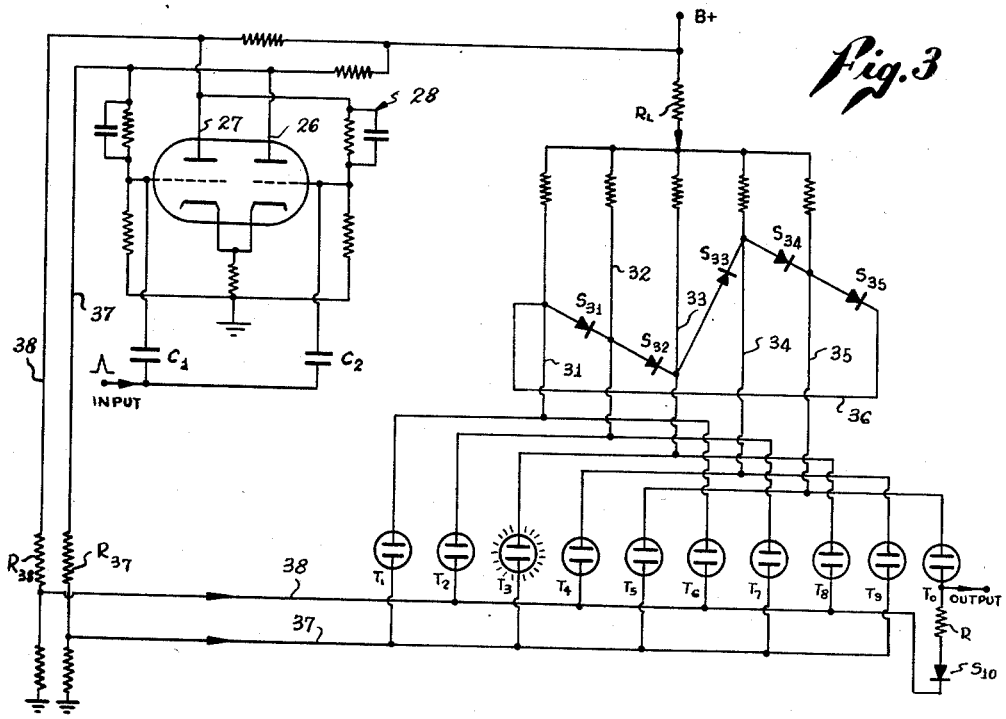
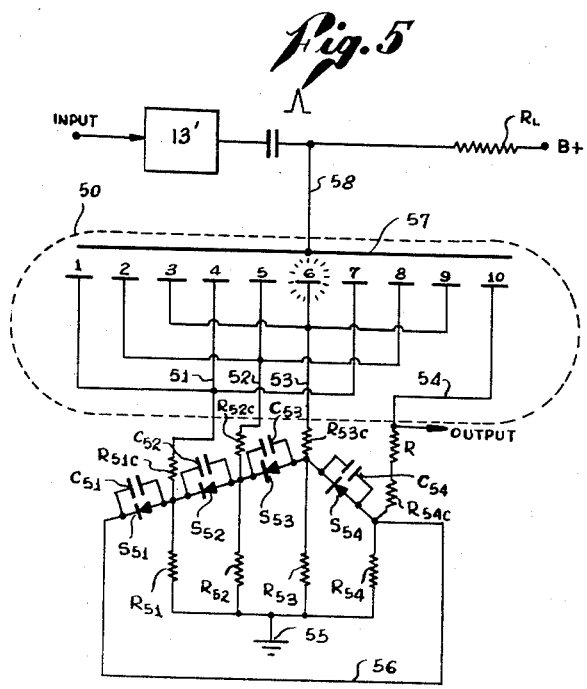
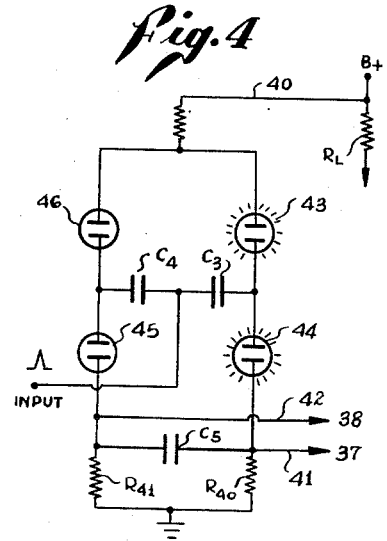
INVENTOR.
ROBERT CREVELING
BY
Attorney April 12, 1960
R. CREVELING
2,932,737
COUNTING CIRCUITS
Original Filed Oct. 24, 1952
3 Sheets-Sheet 3
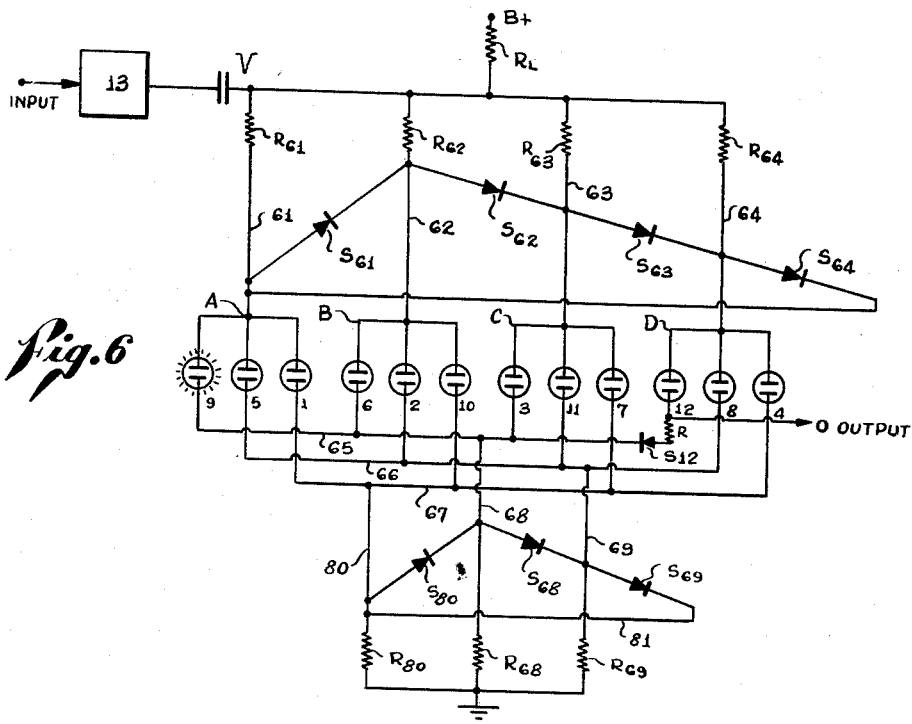
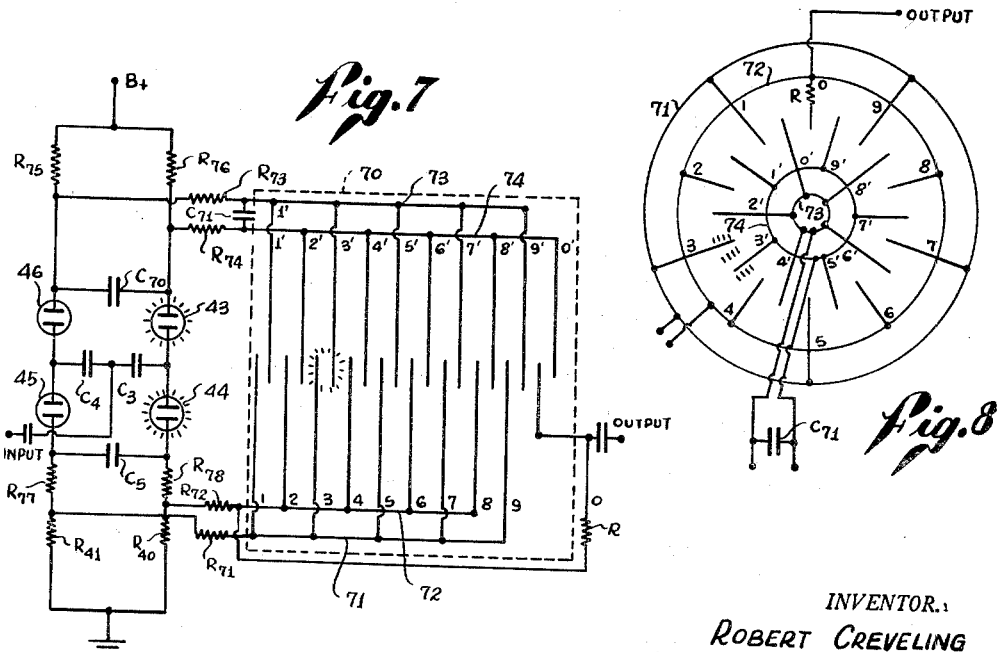
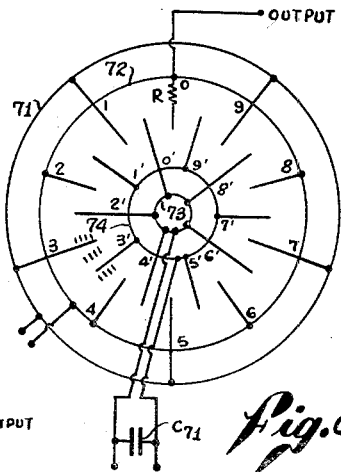
INVENTOR.
ROBERT CREVELING
BY
*Attorney*

United States Patent Office 2,932,737
Patented Apr. 12, 1960

2,932,737

COUNTING CIRCUITS

Robert Creveling, Albuquerque, N. Mex.

Continuation of application Serial No. 316,680, October 24, 1952. This application April 21, 1958, Serial No. 729,989

15 Claims. (Cl. 250—27)

This application is a continuation of an earlier application filed October 24, 1952 in my name, and bearing Serial Number 316,680, now abandoned.

This invention relates to counting circuits and more particularly to high speed electronic counters employing gaseous discharge tubes.

Counting circuits of the type under consideration have wide application, being particularly useful, for example, as basic components in digital computing machines or as frequency dividers to provide time interval control in various electronic devices, to name only a few. These counting circuits generally operate to give a signal that depends upon the number of electrical impulses impressed on the system. Thus, for example, the circuit may "count" or indicate the number of pulses fed into it by assuming a different "state" each time a pulse is impressed. The "state" the circuit is in at any one time will accordingly indicate the number of pulses received.

The Eccles-Jordan and thyratron ring circuits are examples of the above type counters. These systems are generally expensive, the provision of a suitable decade or 1 to 10 counter, for example, requiring four or more vacuum tubes in addition to the associate components.

It is an object of the present invention to provide improved counting circuits of the type employing gaseous discharge tubes, which have relatively fast counting rates and which are inexpensive and simple in design.

More particularly, it is an object to provide a novel counter which is capable of counting regular or random impulses in any numbering system and visibly registering that count.

Another object is to provide a counter which is self-resetting or which may be reset to a predetermined value.

Still another object is to provide novel counting circuits which will yield a single output pulse in response to the accumulation of each predetermined number of input pulses.

Another object is to provide a novel counter which is capable of both adding and subtracting electrical impulses.

A further object is to provide a counter, the basic components of which may be enclosed in one envelope to comprise a single tube having multiple elements.

These and additional objects and features of the invention are attained by the use of a series of relatively inexpensive gaseous discharge tubes, arranged in such a manner that a particular tube will glow or be "on," in accordance with the number of electrical impulses impressed on the system. For example, a series of ten such tubes arranged in accordance with the invention will give a count of from 1 to 10. If the tubes are numbered 1 to 10, receipt of 5 pulses, for example, will cause tube number 5 to glow, the remaining tubes being off. Receipt of ten pulses will cause the 10th or zero tube to glow. The tubes may be arranged in a ring so that they will repeat their firing order after every 10 pulses. Further, several such decade counters may be cascaded so that any number of counts may be registered, a signal from one decade counter serving to trigger the next.

In one embodiment of the invention a ring of rectifiers is incorporated to provide a direction for the count, one rectifier being associated with each gas tube. Alternatively, each rectifier may be replaced by a two-way rectifying means connected in a manner to reverse the rectifying action and permit pulses to be subtracted as well as added.

Other embodiments contemplate novel circuitry permitting the number of rectifiers used in combination with the gas tubes to be reduced, and permitting the provision of a single gas tube envelope containing multiple elements.

A better understanding of the invention will be had by referring to the following detailed description taken in conjunction with the accompanying drawings in which:

Fig. 1 is a schematic illustration of one type of basic counting circuit and rectifier ring constructed in accordance with the present invention;

Fig. 2 illustrates a modified form of the circuit of Fig. 1;

Fig. 3 shows another embodiment of the invention utilizing paired discharge tubes;

Fig. 4 is an alternative circuit component useful in the apparatus of Fig. 3;

Fig. 5 shows still another embodiment of the invention utilizing a multiple element gas tube;

Fig. 6 is yet another embodiment utilizing two rectifier rings;

Fig. 7 shows still another embodiment of the invention; and

Fig. 8 is a diagram showing how the elements in the circuit of Fig. 7 can be arranged in a single envelope.

Referring now to Fig. 1, there is shown a decade counter comprising a series of nine gaseous discharge tubes T1 to T9, and a tenth tube designated T0. Each of these tubes is essentially the same and may consist for example of a simple 1/25 watt neon glow tube. However, any type gaseous discharge tube whose operating voltage is lower than its starting voltage may be employed.

Tubes T1 to T0 are provided with series anode resistances R1 through R0 and are shunt fed from a common B+ voltage supply through a load resistance RL as shown. The cathodes of each of the tubes are grounded at 10 through a common ground lead 11, the cathode of the last tube T0 including a series resistance R from which an output signal may be taken.

Connected between the anodes of adjacent tubes is a series of rectifiers S1 to S0, the last rectifier S0 being connected between the anode of T0 and the anode of T1 by a return conductor 12 to complete a closed ring as shown.

Input pulses to the circuit are derived from a pulse shaping circuit 13 which provides a negative pulse of uniform magnitude and duration in response to any type of pulse impressed thereon. This negative voltage pulse is passed through a blocking condenser C and is impressed on the anodes of the various gas tubes as shown. The rectifiers S1 through S0 have a low resistance in the forward direction, that is, in the direction from T1 to T2; T2 to T3; etc. and a high resistance in the backward direction, T3 to T2; T2 to T1; etc. They may be of the dry disc selenium type.

In the operation of the basic decade counter of Fig. 1, assume there is a series of uniform or random pulses that it is desired to count. These pulses are impressed on the pulse shaping circuit 13 which yields a negative pulse of voltage each time it is triggered by one of the incoming pulses. This negative pulse will indirectly cause tube T1 to "fire" or glow. Receipt of the next negative pulse from circuit 13 will extinguish tube T1 and cause tube T2 to be fired. Similarly, the third pulse received will extinguish tube T2 and fire tube T3. Thus, the "state" of the circuit, that is, which tube is glowing, will indicate the number of pulses received.

To understand this action suppose that three pulses have been received so that tube T3 is "on" as shown in the drawing. In this state, the voltage distribution due to the B+ supply on each of the anodes of tubes T1 to T0 is graphically illustrated by the points 1 through 0 connecting the rectifier ring. Thus, since tube T3 is conducting, there is a relatively large voltage drop across its anode resistance R3 and its anode voltage is therefore low as indicated at point 3. On the other hand, the anode voltage of tube T4 which is not conducting is relatively higher as indicated at point 4. The anode voltage 5 of T5 is slightly less, and so forth around the ring back to the point 3.

The reason for this voltage distribution is because the voltage drop across each rectifier is substantially the same over a wide variation of current. Now if the B+ voltage supply is high with respect to the voltage drop across any particular discharge tube, the current units flowing respectively through the resistances R1 to R0 are roughly the same. Thus the voltage drop across S4 will be due to the unit of current flowing through R4. This current will pick up another unit of current flowing through R5 and both units will pass through S5. Similarly S6 will pass the three units of current from R4, R5 and R6. Since, as stated, the voltage drop across each rectifier is substantially the same over a wide variation of current, each of the rectifiers S4, S5 . . . S0 around to S2 will have nearly equal voltage drops and the total of these voltage drops will be equal to the voltage difference between points 3 and 4. It is highly desirable that the greatest voltage drop occur in the rectifier between the anodes of the tube primed to fire, T4, and the following tube T5 which is not yet to be fired. Unfortunately this rectifier is the one which is carrying the least amount of current. Thus it is evident that the nearer the rectifier becomes to being a constant voltage device the better. Rectifier S3 has a large resistance in the reverse direction and thus there is a large voltage drop in this "backward" direction as shown.

It was stated that the operating voltages of the discharge tubes were much lower than their starting voltages. The voltage B+ and values of the resistances R1 to R0 and of the rectifiers S1 to S0 are such that point 3 is at a voltage that will permit tube T3 to continue operating while point 4 is at a voltage just under that required to start tube T4 discharging. Thus the voltage difference between points 3 and 4 is slightly less than the difference between the operating and starting voltages for the tubes. It will be seen, however, that tube T4 is in a "primed" condition, that is, any increase in its anode voltage will cause it to fire before any of the other tubes will fire.

Now upon receipt of the next negative pulse from the circuit 13, all of the anode voltages will be momentarily decreased. This decrease is of sufficient magnitude to extinguish tube T3. When tube T3 is extinguished and the negative pulse has passed, T3 will not be fired again because its starting voltage is much higher than its operating voltage. Rather, the whole voltage distribution indicated by the points 1 to 0 will be momentarily increased due to the capacity effect of the rectifiers; that is, since the voltage across a capacity cannot change instantaneously, cessation of the negative pulse from 13 and the fact that tube T3 is no longer conducting will cause a momentary rise in the voltage distribution toward the B+ value on all the anodes, and since tube T4 needs the least additional voltage to fire compared to the other tubes, it will fire before any of the others. Conduction by tube T4 will then drop its anode voltage down to the value previously had by tube T3 and tube T5 will now have an anode voltage corresponding to that previously held by T4. Thus each tube will have an anode voltage similar to the anode voltage held by each preceding tube before the receipt of the fourth pulse. T5 will now be primed and upon receipt of a fifth pulse, T4 will be extinguished and T5 will be fired.

An alternative system for causing sequential firing of these tubes would be to supply positive pulses from circuit 13 and provide each tube T1 to T0 with a cathode resistor. In this event, the positive pulse would momentarily increase the conduction of T3 and thus increase the voltage at its cathode due to the cathode resistance. This action would momentarily increase all the anode voltages and would fire tube T4. Due to the inherent capacity in each of the rectifiers, conduction by tube T4 would drop all of the voltages on the tubes momentarily, thereby extinguishing tube T3 and preventing any other tube from firing.

In either system, it is necessary that the inherent rectifier capacity be sufficient to hold the circuit at the decreased voltage sufficiently long to permit the extinguished tube to become completely de-ionized. If the inherent rectifier capacity is insufficient to perform this function, condensers may be added shunting the rectifiers respectively.

It is thus seen that the circuit of Fig. 1 will give a visual indication of the number of pulses received for any number up to ten. Firing of tube T0 will cause a voltage drop across the cathode resistance R. This drop may be used to trigger another decade counter similar to the one shown. Thus, a signal from across R will be passed to the next counter for every ten pulses received by the first counter. The next or second counter will thus count the pulses by tens. A third counter similarly cascaded to the second counter will count the pulses by hundreds and so forth.

It is also to be noted that the direction of the count is determined by the direction of the rectifiers. That is, if each rectifier were reversed, the incoming pulses would fire the tubes successively in reverse order. Therefore, if the rectifiers were reversed while the system were in the state shown in Fig. 1, wherein T3 is "on," the fourth or next input pulse would fire tube T2 rather than T4, thereby indicating the subtraction of a pulse.

Fig. 2 illustrates a modification of Fig. 1, in which each of the rectifiers is replaced by a twin triode providing in effect a two-way rectifier unit. As shown in Fig. 2 the twin triodes 21, 22, 23, etc. each consists of two sections "a" and "b." The grids of the "a" triodes are connected through a resistance r to a common conductor 24 and the grids of the "b" triodes are connected through resistance r to a common conductor 25, the conductors 24 and 25 being connected respectively to the plates 26 and 27 of a simple flip-flop circuit designated generally by the numeral 28. The resistances r are much larger than the anode resistances R1, R2, R3, etc. The flip-flop circuit 28 is triggered by a positive pulse derived from any suitable source 29. This positive pulse may be impressed on either grid of the flip-flop circuit by means of a switch 30. The remaining components of the flip-flop circuit are conventional and need not be discussed in detail here.

The twin triodes providing the two-way rectifier action may be considered as switches. If their characteristics fall short of being constant voltage devices, as pointed out previously as being desirable, then a non-linear element such as thyrite may be included in series with them. These elements were not included in Fig. 2 in order to simplify the circuit shown. Moreover, if tubes with internally connected cathodes are used then common cathodes may be connected to one lead and the respective plates will be connected to the leads on each side. The same circuit will result but the tube envelope will include twin triodes having cathodes joined together in the circuit.

In operation, suppose it is desired to subtract pulses impressed on circuit 13. In this event switch 30 is positioned as shown in dotted lines to apply a positive pulse to the left hand grid of the flip-flop circuit 28 causing conduction through plate 27. The other half of the tube is held below cut-off since its grid is connected to the plate of the conducting half as shown, and since the potential of this plate is dropped due to the plate resistance R27. This same low potential is also impressed upon the grids of all the "b" triodes of tubes 21, 22, 23, etc., through the common conductor 25 holding these tubes off. On the other hand, since the right hand side of the flip-flop circuit tube is not conducting, its plate 26 will be at substantially B+ and this relatively high potential will be applied to the grid of the left hand side maintaining that portion of the tube conducting and also to the grids of all the "a" triodes of tubes 21, 22, 23, etc., through the common conductor 24. The "a" triodes will therefore be capable of conducting current in the "backward" direction, that is to the left, while the "b" triodes will not permit current to travel in the forward or "add" direction. On receipt of a pulse from circuit 13, therefore, tube T3 will be extinguished and tube T2 fired.

If it is desired to add pulses, the switch 30 is placed in the "add" position as shown in solid line, to apply the positive pulse from circuit 29 to the right hand grid of the flip-flop tube rendering this portion of the tube conducting and causing the left hand portion to be cut off. This action results in a high potential being applied to the "b" triodes from conductor 25 and a low or cut-off potential being applied to the "a" triodes. Thus the current direction is now to the right and upon receipt of the next pulse from circuit 13, T3 will be extinguished and T4 will fire.

It is to be understood of course that switch 30 may be electronically operated so that the circuit may be placed in either the "add" or "subtract" condition extremely rapidly. As an example a command pulse may be applied to the grid of triode 26 through a coupling condenser. A positive pulse will cause the circuit 28 to assume the state required for "adding" if it is not already in that position. Likewise a negative pulse on this same grid will result in the circuit being in the "subtracting" position. This later stage may also be achieved by applying a positive pulse to the grid of triode 27 while a negative pulse to the same grid will produce the opposite effect and set up the circuit for additive counting. Thus it may be seen that with an appropriate pulse the circuit may be made to count either forward or backward. The count may be reversed at any desired time with no detrimental effect on the existing count at the time of reversal. By a suitable circuit, the count may be carried back over the decade stages.

Fig. 3 illustrates another embodiment of the counting circuits wherein only half the number of rectifiers is necessary in order to obtain a count of ten. This is accomplished by pairing the anodes of the tubes as shown. Thus, tubes T1, T6; T2, T7; T3, T8; T4, T9; and T5, T0 are paired and connected to five leads 31, 32, 33, 34 and 35 respectively. Each of the leads 31 to 35 includes an anode resistance as shown supplied in shunt by a B+ voltage through load resistance RL. A ring of five rectifiers S31—S35 is connected respectively to the leads 31—35 as shown, the rectifier S35 being connected between lead 35 and lead 31 by return conductor 36. The cathodes of the odd numbered tubes T1, T3, T5, etc., are connected to a common lead 37 and the cathodes of even numbered tubes to a common lead 38. Leads 37 and 38 are connected through voltage dividing resistances R37 and R38 respectively to the plates 26 and 27 of a flip-flop circuit 28 which may be identical to the flip-flop circuit 28 of Fig. 2 although its use in the Fig. 3 embodiment is different. An output resistance R and rectifier S10 are connected in series in the cathode of tube T0 in order that an output signal may be taken therefrom. The rectifier S10 insures that a signal will be had only when tube T0 fires by preventing the formation of any signal due to the firing of the other even numbered tubes.

In the operation of the system of Fig. 3 input pulses to be counted are supplied in the form of positive or negative pulses by any suitable pulse shaping circuit (not shown) and applied to the grids of the flip-flop circuit tube through condensers C1 and C2. As is well known in the art and as is evident from the description of the flip-flop circuit of Fig. 2, either the left hand portion or the right hand portion will be conducting. For example, if the left hand portion is conducting, receipt of a positive pulse on the grids will not affect the left hand portion but will turn on the right hand portion, conduction of this tube portion then cutting off the left hand portion by virtue of the plate to grid connection. The circuit is thus flipped. Receipt of a next positive pulse on the grids will not now affect the right hand portion but will turn on the left hand portion, conduction of this tube portion cutting off the right hand portion. The circuit is thus flopped back to its former state.

It is seen accordingly that a succession of pulses applied to the flip-flop tube circuit grids will alternately cause one portion and then the other portion to conduct. This action will thus alternately apply low and high potentials on the leads 37 and 38 respectively.

As shown in Fig. 3, tube T3 is glowing, indicating that three pulses have been received. In this state, the right hand portion of the flip-flop tube circuit is conducting and the left hand portion is off. Therefore lead 37 and the cathodes of the odd tubes are held at a low potential while lead 38 and the cathodes of the even tubes are held at a high potential. Tube T8 is not conducting even though its anode is connected to T3 because the cathode of tube T8 is connected to lead 38 which is at a high potential. Tubes T5, T7, T9 and T1 have their cathodes connected to lead 37 but because tube T3 is on and holds their anode voltages down through the connection made by the rectifiers S34, S35 and S31, there is not sufficient voltage across these tubes to fire them. The anode voltage distribution on the tubes is illustrated graphically in Fig. 3 by the relative positions of the rectifier connections thereto. Likewise, the cathode leads 37 and 38 are positioned "low" and "high" to indicate their relative voltages at the time T3 is glowing. Thus lead 38 is above lead 37 in the drawing since lead 38 has higher voltage at the moment.

Assume now that a fourth input pulse is impressed on the circuit. This pulse will flop the flip-flop tube circuit so that the left hand portion of the flip-flop tube conducts and the right hand portion is cut off. Thus lead 37 will now carry a high potential and lead 38 will have a low potential. The high potential on lead 37 will extinguish glow tube T3 and the low potential on lead 38 will cause T4 to fire since T4 is in the ready position by virtue of the voltage drops in the rectifier ring as explained in connection with Fig. 1. The other eligible tube T9 will not fire because its cathode is connected to lead 37 which is now high thereby decreasing the voltage across this tube.

Receipt of a fifth pulse will flip the flip-flop circuit again interchanging the voltages on leads 37 and 38 to extinguish tube T4 and now cause tube T5 to glow.

It is thus seen that by the use of a simple flip-flop circuit the system of Fig. 3 can provide a count up to ten by using only five rectifiers. Moreover each discharge gas tube has a longer period to de-ionize because its cathode is held at a high potential and thus is off while the next tube is firing. This will permit faster and more reliable counting.

Fig. 4 illustrates a modified type of flip-flop circuit which may be used in place of the flip-flop circuit shown in Fig. 3, the advantage being that the use of relatively expensive and power consuming vacuum tubes is avoided.

In Fig. 4 the three leads 40, 41 and 42 connect respectively to B+, lead 37, and lead 38 of Fig. 3.

The flip-flop circuit consists of four neon glow tubes 43, 44, 45 and 46 connected as shown, an input positive signal being applied between the junction points of tubes 43, 44 and tubes 45, 46 through relatively small condensers C3 and C4 respectively. The cathodes of the tubes 44 and 45 are shunted by a condenser C5. These cathodes also include cathode resistances R40 and R41 from which output signals to leads 37 and 38 are respectively derived.

In the operation of the glow tube flip-flop circuit of Fig. 4, assume glow tubes 43 and 44 are conducting. The potential on lead 41 will be high due to the drop across resistance R40. This voltage will also be across the condenser C5, the potential of lead 42 being low. Now when a positive pulse is injected at the input, this pulse is of sufficient magnitude to fire the tube 45 which in turn fires tube 46. The associated current will raise the voltage of lead 42 due to the discharge across resistance R41. This increased voltage will immediately be communicated through C5 to the cathode of tube 44 since the voltage across condenser C5 cannot change instantaneously. Tubes 44 and 43 will therefore be extinguished resulting in a transfer of current from tubes 44 and 43 to tubes 45 and 46. Now both tubes 46 and 45 are glowing and tubes 43 and 44 are cut off.

Receipt of the next positive pulse will not affect now glowing tubes 46 and 45 but will fire 44 again causing 45 and 46 to be extinguished through the condenser C5. Thus, the circuit flips or flops with each successive pulse and provides alternately high and low potentials on the leads 37 and 38. A negative input pulse would produce much the same results except the top glow tube would fire first to start the action.

Fig. 5 illustrates another embodiment of the invention in which the number of rectifiers utilized may be reduced by enclosing all of the glow tube elements in a single envelope and providing a common anode.

In Fig. 5 the respective gas tube cathode elements are numbered 1 to 10, the tenth cathode including a resistance R from which an output signal may be taken every time cathode 10 is fired. In this embodiment, cathodes 1, 4, 7; 2, 5, 8; and 3, 6, 9 are tied together to form sets and led from the enclosing envelope 50 by the conductors 51, 52, and 53, respectively. A lead 54 is connected to cathode 10.

The cathode leads 51 to 54 each contain a cathode resistance R51c to R54c shunted to ground at 55 through additional resistances R51 to R54 and include a series of four rectifiers S51—S54 shunted by condensers C51 to C54 arranged in a ring by return lead 56 as shown. The anode comprises a single elongated electrode 57 connected to B+ through a load resistance RL. Electrode 57 may be a wire or cylinder around which the cathodes are placed. The input pulses which are positive in this case are derived from a circuit 13' and fed to the anode 57 through lead 58.

In operation, assume cathode 6 is glowing as indicated. This means that six pulses have been received. The voltage distribution on the cathode leads 51 to 54 is shown graphically by the position of the rectifier connections. It will be noted that since cathode 6 is "on," the voltage across resistance R53 is high. The remaining cathodes have decreasing potentials to the left of cathode 6 due to the direction of and voltage drops in the rectifiers as explained in connection with Fig. 1.

Now upon receipt of the next positive pulse from circuit 13', cathode 6 will be raised in voltage along with the raise in anode voltage. There will be an increase in voltage between the other cathodes and the anode which increase will cause cathode 7 to fire because of its voltage preference and proximity to cathode 6. When cathode 7 fires it will extingush cathode 6 through the capacity coupling in the cathode circuits. Since cathode 7 is also tied to cathodes 4 and 1, these latter two cathodes are also "primed" for firing. But cathode 7 will be favored because of its physical proximity to the ionization present at cathode 6. Cathode 10, although ready to fire, will similarly be discriminated against because of its great distance from cathode 6.

When cathode 7 fires, lead 51 will now assume the voltage value formerly held by lead 53 and lead 52 will assume the voltage value formerly held by lead 51. Thus cathodes 8, 5 and 2 will be in primed condition for firing but because of the proximity of cathode 8 to cathode 7, cathode 8 will be favored over 5 and 2 and will fire when the next positive pulse is impressed. When cathode 10 is fired a signal may be taken off the resistance R and since the cathode lead 54 is not tied to any of the other cathode leads, only one signal from the cathode 10 resistance R will be detected for every ten pulses impressed on the system. As in the case of Fig. 1 this output signal may be used to trigger a second decade counter. This tube circuit may also be arranged to count negative pulses. In this case the resistances R51c through R54c in the cathode circuit are no longer needed and may be removed. The condensers C51 to C54 shunting the resistors R51 to R54, will help to maintain the voltage distribution established by the rectifier on the various cathodes. When a negative pulse is applied to the anode it will extingush the glowing cathode (6 as shown on drawing). Then if the anode voltage is returned toward B+ before complete deionization around cathode 6 takes place, the adjoining cathode, which has the lowest voltage on it will fire. The circuit in this case establishes the proper conditions for cathode 7 to fire. Thus as in the case of the positive pulse description, the count will be made to progress properly. As in the case of Fig. 2 counting may be reversed by "reversing" the rectifier action.

By enclosing the glow tube elements in one envelope, advantage is taken of the fact that of any three cathodes primed for firing, the one closest to the cathode just fired will be favored and this proximity enables the number of rectifiers in the cathode circuit to be reduced.

Fig. 6 illustrates yet another embodiment of the invention wherein the basic counting circuit of Fig. 1 is modified to include two additional glow tubes to give a total count of twelve (duodecimal), and a rectifier ring is included in the cathode circuit.

The glow tubes are numbered 1 through 12 but are not shown in successive order; rather they are grouped in a manner to simplify the circuit diagram.

The operation of the circuit may best be understood by considering the tubes as making up four groups A, B, C, and D, each group consisting of three glow tubes having their anodes tied together as shown. Four anode leads 61, 62, 63 and 64 from the groups A, B, C, and D respectively include anode resistances R61 to R64 supplied in shunt with a B+ voltage through a load resistance RL.

As shown in Fig. 6 the cathodes of the tubes in respective groups are tied together as follows: tubes 9, 6, 3 and 12 are connected to a common conductor 65; tubes 5, 2, 11 and 8 to a common conductor 66; and tubes 1, 10, 7 and 4 to a common conductor 67. The three conductors 65, 66, and 67 are in turn connected to a cathode rectifier ring by three leads 68, 69 and 80 respectively, including cathode resistances R68, R69 and R80. The cathode rectifier ring comprises rectifiers S68, S69 and S80 connected by return lead 81 as shown.

The anode leads 61, 62, 63 and 64 are similarly connected by a rectifier ring comprising rectifiers S61, S62, S63 and S64, these connections being positioned to illustrate graphically the voltage distribution on the leads as in the previous embodiments. A negative input pulse is supplied from circuit 13.

It will be seen from the above arrangement that the anode rectifier ring controls the groups A, B, C, and D, while the cathode rectifier ring controls the respective tubes in each group. That is, since there are four groups, four rectifiers are needed in the anode ring, and since there are only three tubes in each group, only three rectifiers are needed in the cathode ring. The anode ring therefore establishes precedence for a group while the cathode ring establishes precedence for one of the tubes in each group.

In describing the operation of the system of Fig. 6 assume that nine pulses have been received resulting in tube number 9 glowing as indicated. The potential on lead 61 is accordingly low and the potential on cathode lead 68 is high due to the voltage developed across resistances R61 and R68 respectively due to the discharging current.

Receipt of a tenth pulse from circuit 13 will, as explained in connection with Fig. 1, momentarily lower the voltage distribution on the anode leads 61 to 64 extinguishing the tube 9. This action drops the voltage distribution on the cathode leads 80, 68 and 69 since the voltage across R68 is no longer developed and since each rectifier has inherent capacity, the voltage across which cannot change instantaneously. It will be noted that by virtue of the anode rectifier ring voltage drops, group B is the favored group so that upon cessation of the negative pulse, one of the tubes 6, 2, or 10 will fire next. It will also be noted that tube 10 is the only one of this group whose cathode is connected to lead 80, which is at the lowest potential due to the action of the cathode rectifier ring. Therefore, the voltage across tube 10 is greater than that across any other tube and it will therefore fire next.

The circuit is then in a condition to favor group C and the cathode rectifier ring conditioned to favor tube 11 of that group.

The arrangement of Fig. 6 thus provides a count of 12 by using only 7 rectifiers. It is to be noted that the circuit could be arranged with three groups of four tubes each in which case only three rectifiers would be needed in the anode circuit, but four would be required in the cathode circuit. Also, it will be appreciated that in order for every tube to be fired, the number of tubes in each group and the number of groups must be different and also neither of these numbers must be divisible by the same number. For example, if four groups of two tubes each were used, one-half of the tubes would be omitted in the firing sequence because four and two are each divisible by two. Another possible grouping however would be three groups of two tubes each. This system would provide a count of six and in conjunction with the decade counters previously discussed would be useful for representing 60 seconds or 60 minutes. The 12 count system of Fig. 6 could then be used to indicate hours, for example, and its passing through a count of twelve would indicate a half day.

In the circuit of Fig. 6 extracting an output signal to indicate a completed count and a return to zero may be accomplished by a resistance R and diode or rectifier S12 placed in the cathode circuit of tube T12. A means of detecting this output signal when the cathode potential rises due to its firing, rather than when 3, 6 or 9 fire may take the form of a pulse transformer placed in the circuit to produce a pulse when tube 12 conducts. Another scheme would consist of a gas tube circuit across tube T1 which will break down at the time this tube is primed to fire, that is, when the previous tube 12 comes on. This circuit should be of a high enough impedance to prevent any undue effect on the basic circuit but capable of producing an output signal sufficient in strength to carry over to the next stage.

Fig. 7 shows a modified type of decade counting circuit in which the use of rectifiers is avoided by using a single envelope housing multiple elements and a flip-flop circuit.

As shown in Fig. 7 a single envelope 70 houses a series of cathodes 1 to 9, a tenth cathode being designated 0 and including an external resistance R from which an output signal may be taken as shown. The odd numbered cathodes are connected to a common conductor 71 and the even numbered cathodes are connected to a common conductor 72, the conductors 71 and 72 including cathode resistances R71 and R72 respectively.

Corresponding anodes are numbered 1' through 0' and the odd and even anodes are connected respectively to common conductors 73 and 74 including anode resistances R73 and R74.

Cathode leads 71, 72 and anode leads 73, 74 are connected to a glow tube flip-flop circuit similar to the glow tube flip-flop described in Fig. 4 except that additional resistances R75, R76, R77 and R78 and condenser C70 are added. The remaining circuit elements in the flip-flop circuit are designaed by he numerals used to designate the corresponding elements in Fig. 4.

As shown, leads 73 and 74 connect to the anodes of tubes 46 and 43 through resistances R73 and R74 respectively while leads 71 and 72 connect to the cathodes of tubes 45 and 44 through resistances R71, R77 and R72, R78 respectively.

In describing the operation of the counter of Fig. 7, assume cathode 3 and anode 3' are glowing as indicated. This means that three pulses have been impressed so far on the circuit. In this state, the flip-flop glow tubes 43 and 44 are discharging, resulting in a low potential on lead 74 due to the voltage drop across R76 and a somewhat elevated potential on lead 72 due to the voltage drop across resistance R40. The potential on lead 74 is less than that on lead 73 while that on 72 is higher than that on 71 which insures that current flows only between cathode 3 and anode 3'. For this particular position of operation, it is important that anode 3' be at a higher potential than the competing nearby anode 2'.

Now upon receipt of a positive pulse on the flip-flop circuit glow tubes, 45 and 46 are fired and glow tubes 43 and 44 extinguished through the action of condensers C70 and C5, resulting in the application of a high potential on lead 74 which tends to rise to B+ with tubes 43 and 44 off. Also there results a drop in the potential on lead 72 because of the cessation of current through R40. Therefore, the even numbered anodes and even numbered cathodes are all primed to fire, each set having a relatively high potential between them. With flip-flop tubes 46 and 45 now discharging, the voltage difference between leads 73 and 71 diminishes sufficiently to extinguish the cathode-anode glow 3—3'.

It is seen now that either cathode-anode set 2—2' or cathode-anode set 4—4' is in condition to glow. Since these elements are respectively connected to leads 72 and 74, they both have the same voltages across them and since they are both adjacent the previously glowing set 3—3', there is no reason to suppose that the 4—4' set should be favored to fire next over the 2—2' set. The remaining sets are not affected since they are too far away from the previously glowing set 3—3'.

In order to insure that the 4—4' set will fire rather than the 2—2' set, a small condenser C71 is connected between the leads 74 and 73 the action of which is to delay the interchange of voltage between these leads when the flip-flop circuit switches. This has the effect of preventing 74 from immediately increasing in potential so that the new glow discharge will begin at the cathodes in envelope 70. Now since cathode 4 is more proximate than cathode 2 to the previous discharge glow between 3 and 3', cathode 4 will begin to ionize the surrounding gas before cathode 2, and thus the set 4—4' will be favored over the set 2—2'. This phenomenon results from the strategic spacing of the anodes from the cathodes. Thus the anodes 1', 2', 3', etc., are displaced to the right of the cathodes 1, 2, 3 and therefore the count proceeds to the right. This action is as though the ionization were handed from element pair to element pair around the circle.

Fig. 8 shows how the cathode and anode elements in the envelope 70 of Fig. 7 may be arranged in a circular manner to fit compactly in a tube. Corresponding elements in Fig. 8 are identified by the numerals used in Fig. 7.

The embodiment of Fig. 7 thus provides an extremely compact decade counter which by virtue of its geometrical design and the use of the flip-flop, will give additive count in one direction and without the use of rectifiers.

It should be kept in mind that numerous modifications may be effected in all the disclosed embodiments without departing from the spirit of the invention.

For example, while ten gaseous discharge tubes are shown as exemplary of decade counters, any number of tubes may be provided to provide any number of counts. Further, the two-way rectifying means illustrated in Fig. 2 may be used in place of the rectifiers in the embodiments of Figs. 3, 5 and 6 to provide different sequential firing. This idea may also be employed with vacuum tube circuits of the ring type where extremely high speeds are required.

It is also to be noted that the rectifier ring of Fig. 1 could have been included in the cathode circuit rather than the anode circuit in which case the system would operate in accordance with the principles described in connection with the cathode rectifier ring of Fig. 5.

In a circuit of the type shown in Fig. 6 it is possible to omit certain gas tubes in order to provide different counting sequences and number systems.

One of the primary advantages of the counting circuits of this invention resides in the maximum use of glow tubes rather than vacuum tubes although the latter may be employed. Glow tubes use very little power and have a long life by comparison.

Since any one of the disclosed circuits yields an output pulse in response to the accumulation of a predetermined number of input pulses (ten for example), the counters are very useful as frequency dividers.

Other variations, modifications, and uses of the fundamental circuits disclosed will occur to those skilled in the art. The invention is therefore not to be thought of as limited to the precise embodiments disclosed.

I claim:

1. A counting circuit comprising, in combination: a series of gaseous discharge devices each having only two spaced elements between which a gaseous discharge may take place and in which the starting voltage for such discharge is greater than the operating voltage; a source of voltage applied in shunt across said discharge devices; conductors directly connecting corresponding elements in certain ones of said gaseous discharge devices together to form groups of discharge devices; further conductors including resistance elements connecting said groups to said voltage source; and means responsive to an input pulse for extinguishing a discharge device in one of said groups and firing a discharge device in another of said groups.

2. A counting circuit according to claim 1, in which each of said groups comprises two discharge devices the connected elements of each group being anodes; rectifier means between each of said conductors forming a closed ring of rectifiers; said further conductors comprising a pair of leads connected respectively to the cathodes of the two discharge devices in each group; and said means comprising a flip-flop circuit for applying alternately high and low potentials to said pair of leads.

3. A counting circuit according to claim 1 in which elements different from said corresponding elements in said discharge devices are connected together to form an elongated anode; said groups each comprising three discharge devices respectively having their cathodes connected together by said conductors; an output lead connected to the cathode of one of said gaseous discharge devices not included in any of said groups; said means comprising rectifier means connected between each of said further conductors and said output lead to form a closed ring of rectifiers; and a single envelope means enclosing said elongated electrode and all of said cathodes in a gaseous atmosphere.

4. A counting circuit according to claim 1, in which each of said groups comprises three discharge devices, the corresponding elements in each group being anodes; rectifier means between each of said conductors forming a closed ring of rectifiers; said further conductors comprising three leads, each lead being connected to one cathode in each group not connected to either of the other two leads; and said means comprising rectifier means respectively connected between said three leads to form a closed ring of rectifiers.

5. A counting circuit according to claim 1, in which there are two of said groups, each group including discharge devices alternately disposed in said series; two of said conductors comprising a first pair connected to corresponding anodes in said groups, said further conductors comprising a second pair of conductors connected to corresponding cathodes in said groups; said means comprising a flip-flop circuit connected to said first pair of conductors to apply alternately high and low potentials thereto respectively in response to said input pulses; a pair of voltage dropping resistances in said flip-flop circuit; said second pair of conductors being connected to said flip-flop circuit below said voltage dropping resistances whereby alternately high and low potentials are applied thereto; a condenser shunting said first pair of conductors; said anodes being displaced respectively in the same direction with respect to their associated cathodes; and a single envelope enclosing said anodes and cathodes in a gaseous atmosphere.

6. A counting circuit comprising, in combination: a series of successively adjacently disposed gaseous discharge devices each having an anode and one cathode only and each having an operating voltage that is lower than its starting voltage; a source of voltage applied in shunt across said discharge devices; said gaseous discharge devices being arranged in groups, each group consisting of an equal number of discharge devices, said number of discharge devices in each group being different from the number of groups, said number of discharge devices in each group and the number of groups not being integrally divisible by the same number excluding divisibility by unity; the anodes of the discharge devices in each group being connected together and the cathodes of corresponding discharge devices in the groups being connected together; a first plurality of conductors equal to the number of groups and connected respectively thereto through resistance elements; a second plurality of conductors equal to the number of discharge devices in each group and connected to said corresponding cathodes; and first rectifying means connected between said first plurality of conductors, the last conductor associated with the last group being connected to the first conductor associated with the first group through a rectifying means, whereby a closed ring of rectifiers is provided; and means connected to said second plurality of conductors for superimposing an input pulse of voltage on the voltage derived from said voltage source; said rectifier means and said means being responsive to said input pulse and to voltages developed across said resistance elements for extinguishing one of said discharge devices and firing another discharge device.

7. A counting circuit according to claim 6, in which there are two discharge devices in each of said groups, said means comprising a flip-flop circuit connected to said second plurality of conductors whereby alternate high and low potentials are applied thereto.

8. A counting circuit, comprising: a first group of gaseous discharge devices each having an anode and a cathode only, and each having an operating voltage that is lower than its starting voltage; a second group of similar gaseous discharge devices equal in number to said first group, each anode of a discharge device of said first group being connected respectively to the anode of a discharge device of said second group to form pairs; a plurality of conductors each connected respectively to the anodes of each pair of discharge devices; a source of voltage; means connecting said source of voltage to said conductors and said discharge devices for providing a supply voltage across said discharge devices; rectifying means connecting one conductor to another in serial sequence to form a closed ring of rectifiers; a flip-flop circuit having an input and two outputs, a high potential being produced on one output while the other is low and said flip-flop circuit being responsive to input pulses by alternating said output potentials for each input pulse thereto; first means connecting the cathodes of said first group of discharge devices to a flip-flop output; and second means connecting the cathodes of said second group to the other flip-flop output, for applying said flip-flop output potentials to said discharge devices.

9. A counting circuit according to claim 8 including, in addition, output means for providing counting circuit output signals, comprising a resistor and series rectifier connecting the cathode of a discharge device in a group with the other cathodes of the discharge devices in the group.

10. A counting circuit according to claim 8 in which said flip-flop circuit comprises a first gaseous discharge device having an anode and a cathode; a second similar gaseous discharge device connected in series therewith; a first resistance connected in series with said second gaseous discharge device forming a first series circuit; a third similar gaseous discharge device; a fourth similar gaseous discharge device connected in series with said third gaseous discharge device; a second resistance connected in series with said third gaseous discharge device forming a second series circuit; means for connecting said first and second series circuits in shunt and applying a supply voltage across said series circuits; a first capacitance connected to the common junction of said first and second gaseous discharge devices; a second capacitance in series connecting said first capacitance to the common junction of said third and fourth gaseous discharge devices; a third capacitance connecting the common junction of said second gaseous discharge device and said first resistance with the common junction of said fourth gaseous discharge device and said second resistance; input leads connecting the common junctions of said first and second capacitances and said first and second resistances; first output leads connected across said first resistance providing a first flip-flop output; and second output leads connected across said second resistance providing a second flip-flop output.

11. A counting circuit according to claim 10 including, in addition, output means for providing counting circuit output signals, comprising a resistor and series rectifier connecting the cathode of a discharge device in a group with the other cathodes of the discharge devices in the group.

12. A counting circuit, comprising: a first group of gaseous discharge devices each having an anode and a cathode only, and each having an operating voltage that is lower than its starting voltage; a second group of similar gaseous discharge devices equal in number to said first group, each anode of a discharge device of said first group being connected respectively to the anode of a discharge device of said second group to form pairs; a plurality of resistors each connected respectively to the anodes of each pair of discharge devices; a source of voltage; means connecting said source of voltage to said resistors and said gaseous discharge devices for applying a supply voltage across said discharge devices; rectifying means connecting one anode pair to another pair in serial sequence to form a closed ring of rectifiers; a flip-flop circuit having an input and two outputs, a high potential being produced on one output when the other is low and said flip-flop circuit being responsive to input pulses by alternating said output potentials for each input pulse thereto; first resistance means connecting the cathodes of said first group of discharge devices to a flip-flop output; and second resistance means connecting the cathodes of said second group to the other flip-flop output, for applying said flip-flop output potentials to said discharge devices.

13. A counting circuit according to claim 12 including, in addition, output means for providing counting circuit output pulses, comprising a resistor and series rectifier connecting the cathode of a discharge device in a group with the other cathodes of the discharge devices in said group.

14. A counting circuit according to claim 12 in which said flip-flop circuit comprises a first gaseous discharge device having an anode and a cathode; a second similar gaseous discharge device connected in series therewith; a first resistance connected in series with said second gaseous discharge device forming a first series circuit; a third similar gaseous discharge device; a fourth similar gaseous discharge device connected in series with said third gaseous discharge device; a second resistance connected in series with said third gaseous discharge device forming a second series circuit; means for connecting said first and second series circuits in shunt and applying a supply voltage across said series circuit; a first capacitance connected to the common junction of said first and second gaseous discharge devices; a second capacitance in series connecting said first capacitance to the common junctions of said third and fourth gaseous discharge devices; a third capacitance connecting the common junction of said second gaseous discharge device and said first resistance with the common junction of said fourth gaseous discharge device and said second resistance; input leads connecting the common junctions of said first and second capacitances and said first and second resistances; first output leads connected across said first resistance providing a first flip-flop output; and second output leads connected across said second resistance providing a second flip-flop output.

15. A counting circuit according to claim 14 including, in addition, output means for providing counting circuit output signals, comprising a resistor and series rectifier connecting a cathode of a discharge device in a group with the other cathodes of the discharge devices in the group.

References Cited in the file of this patent
UNITED STATES PATENTS

| 2,549,779 | Crenshaw | Apr. 24, 1951 |
| 2,558,178 | Hagen | June 26, 1951 |
| 2,575,517 | Hagen | Nov. 20, 1951 |
| 2,618,767 | Von Gugelberg | Nov. 18, 1952 |
| 2,635,810 | Townsend | Apr. 21, 1953 |
| 2,644,111 | Desch | June 30, 1953 |
| 2,651,740 | Lair | Sept. 8, 1953 |
| 2,740,921 | Hough et al. | Apr. 3, 1956 |
| 2,780,751 | Ridler | Feb. 5, 1957 |